US006991426B2

(12) United States Patent
Pietricola

(10) Patent No.: US 6,991,426 B2
(45) Date of Patent: Jan. 31, 2006

(54) VARIABLE PITCH FAN

(76) Inventor: Paolo Pietricola, C.so Vittorio Emanuele II, 130, Statte I-74010 (IT)

(*) Notice: Subject to any disclaimer, the term of this patent is extended or adjusted under 35 U.S.C. 154(b) by 208 days.

(21) Appl. No.: 10/451,042

(22) PCT Filed: Jan. 9, 2002

(86) PCT No.: PCT/EP02/00132

§ 371 (c)(1),
(2), (4) Date: Jun. 18, 2003

(87) PCT Pub. No.: WO02/055845

PCT Pub. Date: Jul. 18, 2002

(65) Prior Publication Data

US 2004/0042897 A1 Mar. 4, 2004

(30) Foreign Application Priority Data

Jan. 11, 2001 (IT) .................................... BA2001A0002

(51) Int. Cl.
*F01D 1/02* (2006.01)

(52) U.S. Cl. ....................................... 415/193; 416/242

(58) Field of Classification Search ............. 415/193–4, 415/149.1–149.4, 205, 164–168 R, 244 A, 415/174; 416/242; 60/39.183, 72
See application file for complete search history.

(56) References Cited

U.S. PATENT DOCUMENTS

| | | | | |
|---|---|---|---|---|
| 3,146,755 A | | 9/1964 | Morse | |
| 3,799,698 A | | 3/1974 | Haworth | |
| 3,814,549 A | | 6/1974 | Cronstedt | |
| 3,860,361 A | | 1/1975 | McMurtry et al. | |
| 3,870,434 A | | 3/1975 | Paulson | |
| 3,910,721 A | | 10/1975 | McMurtry | |
| 3,922,852 A | * | 12/1975 | Drabek | 60/226.1 |
| 5,205,712 A | * | 4/1993 | Hamilton | 416/155 |
| 5,215,434 A | | 6/1993 | Greune et al. | |
| 5,311,736 A | | 5/1994 | Lardellier | |
| 5,597,138 A | | 1/1997 | Arlton et al. | |
| 5,794,432 A | * | 8/1998 | Dunbar et al. | 60/204 |
| 5,911,679 A | | 6/1999 | Farrell et al. | |
| 6,071,076 A | | 6/2000 | Ansari et al. | |
| 6,071,077 A | | 6/2000 | Rowlands | |
| 6,292,763 B1 | * | 9/2001 | Dunbar et al. | 703/7 |

FOREIGN PATENT DOCUMENTS

| | | |
|---|---|---|
| WO | WO 99/15399 | 4/1999 |

* cited by examiner

*Primary Examiner*—Edward K. Look
*Assistant Examiner*—James M. McAleenan
(74) *Attorney, Agent, or Firm*—Merchant & Gould P.C.

(57) ABSTRACT

A variable pitch fan, particularly for propulsion, of the type comprising a rotor and at least two stages of stator blade rows positioned upstream and downstream of the rotor, wherein the rotor blades (8) are of the variable pitch type and have a sinusoidal shape, are of the twisted type (1) or of the constant deflection type (2) and the stator blades (25), positioned downstream of the rotor, are of the twisted type. This rotor blade design allows a reduction of both the torque necessary to activate the variable pitch systems (lither actuator system) and the turning moments due to the centrifugal force. The proposed fan can be set in rotation by a conic couple of gears, contained in a gear oil sump positioned downstream the rotor, by means of one power shaft contained inside the stator blade.

The variable pitch fan further provides a stator row upstream the rotor which are twisted in a manner that allows increased efficiency. The stator row downstream the rotor has a movable twisted part actuated by way of a simple electro mechanic system.

This invention even further provides a light screw female system, actuated by an electric motor, to rotate the variable pitch rotor blades.

14 Claims, 19 Drawing Sheets

*Variable Pitch Fan*

| V (m/sec) | n (rpm) | $\gamma = V/n$ | $\eta$ |
|---|---|---|---|
| 0 | 11000 | 0,0000 | 0,00 |
| 10 | 11000 | 0,0009 | 0,72 |
| 25 | 11000 | 0,0023 | 0,79 |
| 50 | 11000 | 0,0045 | 0,82 |
| 75 | 9850 | 0,0076 | 0,83 |
| 100 | 9000 | 0,0111 | 0,82 |
| 125 | 8350 | 0,0150 | 0,82 |

Fig.19 *Iper-Fan with "Twisted" Stator Row*

| Vo (m/sec | n (rpm) | $\gamma = V/n$ | $\eta$ |
|---|---|---|---|
| 0 | 11000 | 0,0000 | 0,00 |
| 10 | 11000 | 0,0009 | 0,66 |
| 25 | 11000 | 0,0023 | 0,78 |
| 50 | 10550 | 0,0047 | 0,85 |
| 75 | 8700 | 0,0086 | 0,88 |
| 100 | 6800 | 0,0147 | 0,91 |
| 125 | 5150 | 0,0243 | 0,95 |

Fig.20 *Iper-Fan with "Constant Deviation" Stator Row*

| V (m/sec) | n (rpm) | $\gamma = V/n$ | $\eta$ |
|---|---|---|---|
| 0 | 11000 | 0,0000 | 0,00 |
| 10 | 11000 | 0,0009 | 0,67 |
| 25 | 11000 | 0,0023 | 0,79 |
| 50 | 9850 | 0,0051 | 0,88 |
| 75 | 7900 | 0,0095 | 0,92 |
| 100 | 6400 | 0,0156 | 0,91 |
| 125 | 4900 | 0,0255 | 0,86 |

Fixed Pitch Fan

| V (m/sec) | n (rpm) | γ = V/n | η |
|---|---|---|---|
| 0 | 11000 | 0,0000 | 0,00 |
| 5 | 11000 | 0,0005 | 0,51 |
| 15 | 11000 | 0,0014 | 0,70 |
| 25 | 11000 | 0,0023 | 0,76 |
| 35 | 11000 | 0,0032 | 0,79 |
| 45 | 11000 | 0,0041 | 0,79 |
| 60 | 11000 | 0,0055 | 0,75 |

VARIABLE PITCH FAN

FIELD OF THE INVENTION

This invention refers to a turbine engine with variable pitch rotor blades having a drop shape; the engine according to the invention can advantageously also incorporate a "twisted" or a "constant deflection" stator blade row in the Air-Intake and, in the nozzle, a stator blade row with a movable twisted part.

The propulsion system, wherein the movable parts are controlled and actuated electrically, can be employed both for the aeronautic propulsion and for the marine propulsion.

BACKGROUND OF THE INVENTION

As it is well known in the state of the art, running a fix pitch fan to high speed, it's necessary to design the twist of the rotor blades with high pitch angles. This implies the ejected air speeds to be high also in the low advancement speed (i.e. lending and take-off phases). But, high difference of speed amongst the inlet and the outlet of a fan mean great power to be supplied, low efficiency and high noise emissions. Hence from the 70's have been developed the turbofan with high by-pass ratio; these last allow accelerating less the higher capacity of air, achieving the same thrust but with higher efficiency, in respect with the jet.

It's also known that the best way to reduce the ejection air speeds in the low speed phases is to adapt the pitch of the rotor blades. In this manner, amongst the inlet and the outlet of a fan, it's possible to obtain reasonable difference of velocity in all the flight phases. Moreover, reducing the ejection air speed in the low flight velocity allows to abate the noise emission and to increase the static pressure downstream the fan. The increase of the static pressure, further associated to the higher rotor blades surface projected in the thrust sense, allows achievement of high thrust.

It's further known that the variable pitch fan can be used as a brake or as a thrust reverser, thus reducing the weight of the whole fan by eliminating the normal thrust reverser system.

It's for those reasons that the variable pitch fan, particularly for turbine engines, has been widely disclosed in the state of art. But no one arrangement has been yet developed and commercialised. The variable pitch rotor blades have been practically employed only in the open propeller, generally matched to turbo-prop.

The solutions proposed until today, which have some comparisons to this invention, are focused on solving the following matters: deal with the high dynamic turning moment due to the centrifugal forces (i.e. U.S. Pat. No. 3,870,434); reduce the loads due to actuator contained in the rotor (i.e. U.S. Pat. No. 3,922,852); realize a simple actuation system (i.e. U.S. Pat. No. 6,071,076); increase the overall efficiency modifying also the pitch of the stator blades (i.e. U.S. Pat. No. 5,911,679, U.S. Pat. No. 5,794,432 and U.S. Pat. No. 5,215,434); turn the rotor with a gearbox by way of an external engine (i.e. U.S. Pat. No. 3,146,755).

Currently, the turbine engines utilised in propulsion are predominantly of the Turbo-Engine type; as it is known, in this type of engines a turbine/compressor group rotates a power shaft to which a fixed pitch propeller located at the end of a divergent duct is connected; this duct called Air Intake, usually free of stator blades, has the scope to decelerate the air processed by the rotor in order to increase the efficiency.

These propulsion systems have the same limits of the fixed pitch propeller, which can be summarized as follows:

1. the efficiencies decrease very rapidly above defined speeds V of advancement;
2. the resultant of the applied forces coincides at the end of the blades, with consequent bending stresses which alter the system aerodynamics.

In the Engines with ducted propellers, which have the scope to generate a thrust useful for the propulsion, none of the expedients which are proposed and justified in this analysis has been utilised.

In some jet engines, stator blade row (in some cases with movable twisted part) are located upstream of the rotor in the stages of the axial compressors, but to vary the performance modifying the pressure and to avoid the stall.

The variable pitch technique is instead widely utilised but only in he outside propellers for reasons that will be discussed hereinafter.

BRIEF SUMMARY OF THE INVENTION

It's the aim of this invention to solve the problems described above by using much simpler solutions.

According to the invention, a variable pitch fan is provided, particularly for propulsion and power generation, comprising at least one stator row upstream and/or downstream the rotor, characterized by the rotor blades having a sinusoidal shape that allows reduction of both the torque necessary to activate the variable pitch systems (lither actuator system) and the turning moments due to the centrifugal force. The proposed fan can be set in rotation by a conic couple of gears, contained in a gear oil sump positioned downstream the rotor, by means of one power shaft contained inside the stator blade.

It's also an object of this invention to provide, in one hand, a stator row upstream the rotor (the "nozzle" ones because are suitable to increase the relative speeds) which are twisted in a such particular way that allows increased efficiency; in the other hand, a stator row downstream the rotor (the "diffuser" ones because are suitable to decrease the absolute speeds) that has a movable twisted part actuated by way of a simple electro mechanic system.

A still further object of this invention is to provide a light screw female system, actuated by an electric motor, to rotate the variable pitch rotor blades.

These objects and other advantages of this invention will become readily apparent from the following drawings and description, all of which are intended to be representative of, rather than in any way limiting on, the scope of invention.

BRIEF DESCRIPTION OF THE SEVERAL VIEWS OF THE DRAWINGS

We will now describe the engine according to the invention, with reference to the attached drawings, in which.

DETAILED DESCRIPTION OF THE INVENTION

To explain the introduced features in relation to the known art, this description will begin from the speed triangles known in this section.

Figure 2:
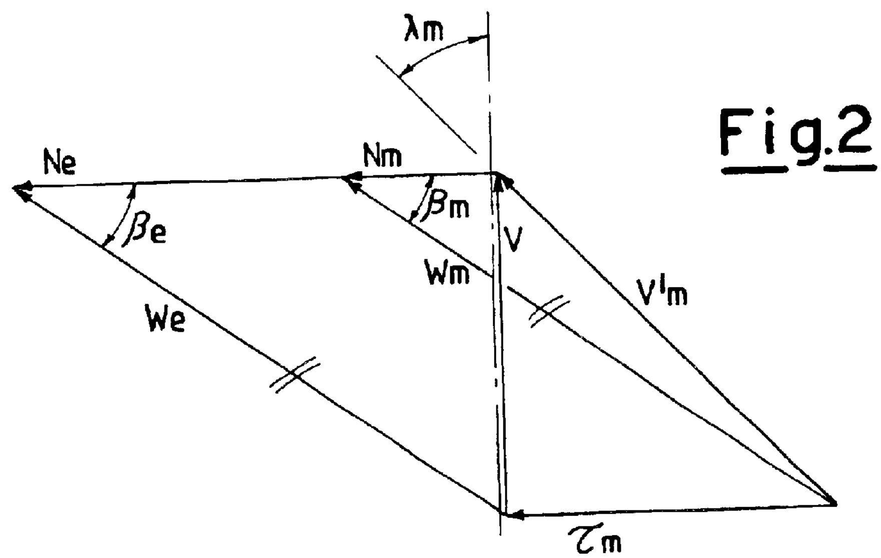
Figure 3:
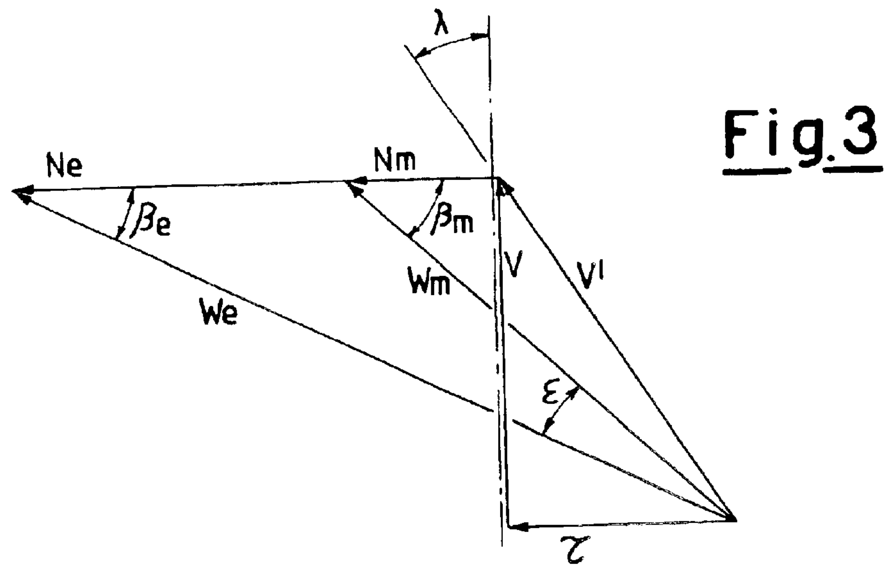
Figure 4:
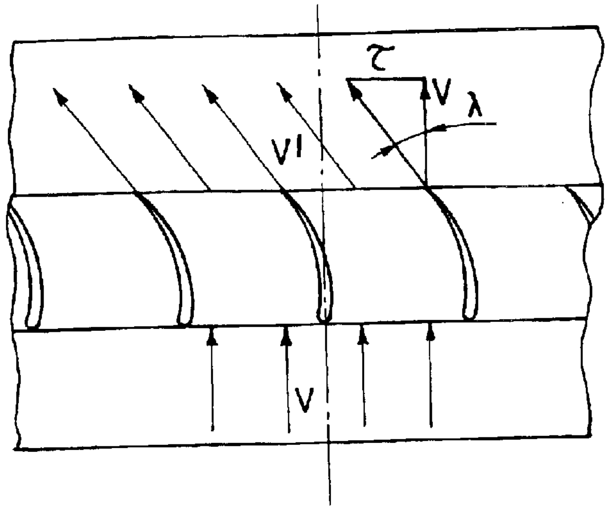

The field diagram is a vectorial diagram in which are represented the speed triangles of all the rotor blade sections. The main purpose of this diagram is to determine geometrically the twist of the propellers. The twist is defined from the stagger angles θ along the rotor blades. θ are the angles subtended from the turning speed U and the relative speed W (also defined with the symbol β) determined in the design phase (refer to FIG. 1). In the field diagrams outlined in the enclosed figures, only the speed triangles to the root m and to the tip e of the blades have been represented. The values of the speeds are brought back in this diagram transforming them from m/sec in cm. The reference necessary to draw this diagram is the propeller spin axe A.R. The speeds U are perpendicular to A.R., proportional to the radius and depend from the number of turns of the impeller. The direction of the speeds V depends instead from the type of the fan/propeller:

- in the outside propellers and in the ducted propellers without stator row upstream the rotor they are always parallel to A.R. (i.e. FIG. 1);
- in the ducted propeller with stator row upstream the rotor they are deflected of λ degrees (angles between the speeds V and A.R.). The deflection depends from the type of stators (twisted or with constant deflection). In FIG. 2 is represented a field diagram which outlines the presence of one twisted stator row (at the root, V is deviated of $\lambda_m$ degrees, while at the tip it's parallel to A.R.). In FIG. 3 is represented a field diagram which outlines a stator row that everywhere deflects the streamlines of λ degrees. It's underlined that the stator rows according to the invention are the "nozzle" type that increase the relative speeds (refer to FIGS. 2-3).

Thus the deflection angles λ: are zero in the external propellers and in the fans that don't have stators upstream the rotor, are design data in the fans with constant deflection angles; while, in the fans with twisted stator row according to the invention are determinate imposing that, in the design phase, the relative speeds W along all the rotor leading edges have the same direction of the tip relative speed $W_s$. in FIG. 2 are outlined only the stator twist design triangles to the tip e and the hub m; in this fan the rotor blades have been twisted so that the axial speeds V are equal in all the radial sections, but they could further increase or decrease from the hub toward the tip depending from the rotor twist.

The twisted stator row has been designed in such a way, to increase the propeller efficiency. The propeller efficiency η is the ratio between the work L yield and the one spent:

$$\eta = \frac{L_{yield}}{L_{spent}} = \frac{TV}{C\omega} = \frac{TV}{\sum F_r R\omega} = \frac{TV}{\sum F_r U} \propto E\frac{V}{U}$$

Figure 5:
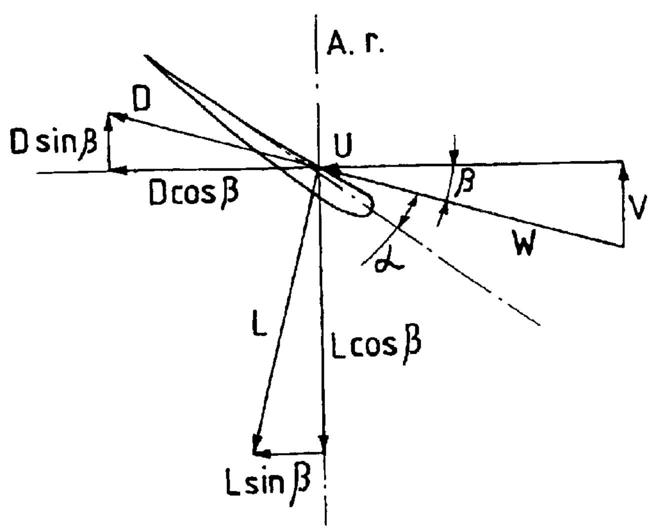
Figure 6:
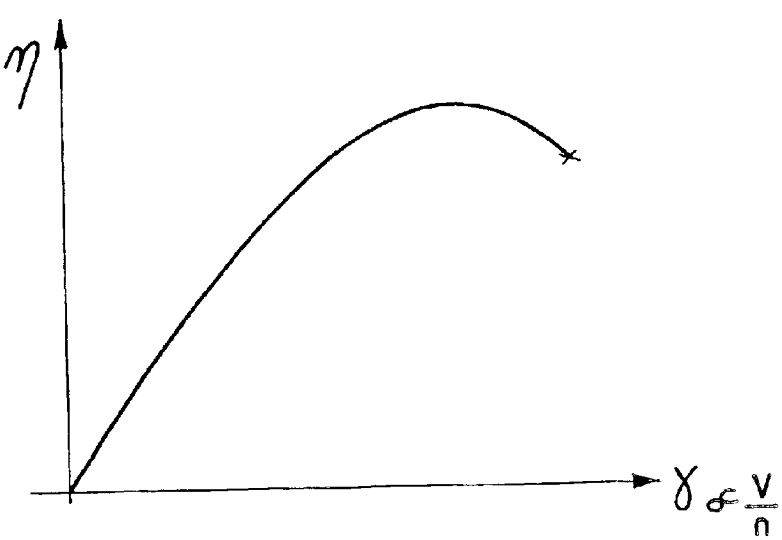

As it can be seen, η is proportional to the aerodynamic efficiency E and should increase, increasing the ratio V/U. In reality η increases up to a definite value of V/U, but then it decreases. Indeed, by increasing V, the angles β increase and cause E to decreases more than the increase of the ratio V/U. The aerodynamic efficiency E is the ratio between the thrust T produced from the propeller and the drag force Fr which resists to the propeller rotation. T and Fr are respectively the forces which act along the parallel and the perpendicular direction to A.R.; they are equal, in module, to the algebraic sum of the vectorial components of the Lift L and of the Drag D along said directions. Referring to FIG. 5:

$$E = \frac{T}{Fr} = \frac{(L\cos\beta - D\sin\beta)}{(D\cos\beta + L\sin\beta)} =$$

$$\frac{1/2\rho SW^2(S_l\mathrm{Cos}\beta - C_d\mathrm{Sin}\beta)}{1/2\rho SW^2(S_l\mathrm{Sin}\beta + C_d\mathrm{Cos}\beta)} = \frac{(C_l\mathrm{Cos}\beta - C_d\mathrm{Sin}\beta)}{(C_l\mathrm{Sin}\beta + C_d\mathrm{Cos}\beta)}$$

$$E = \frac{(C_l/C_d)\mathrm{Cos}\beta - \mathrm{Sin}\beta}{(C_l/C_d)\mathrm{Sin}\beta + \mathrm{Cos}\beta} = \frac{(C_l/C_d) - Tg\beta}{(C_l/C_d)Tg\beta + 1}$$

From this last equation it is understood that the lower the value of β, the higher is E. To increase the propeller efficiency it's thus necessary to reduce the value of the angles β. That can be done adding one "nozzle" stator row upstream the impeller. Adopting constant deflection ones, all the angles β will be reduced along the rotor blades. But, for the continuity, the relative speed W will assume everywhere higher values, even on the tip of the fan. The increase of the speed W on the tip could produce the speed to become supersonic. To avoid the speed W become supersonic it should be reduced the number of turns "n", however this would also reduce the overall turbine performance. Thus, the better way to reduce the β angles, without obtaining supersonic W speeds to the tip of the fan and without reducing the overall turbine efficiency, is to adopt the twisted stator row according to the invention.

Figure 1:
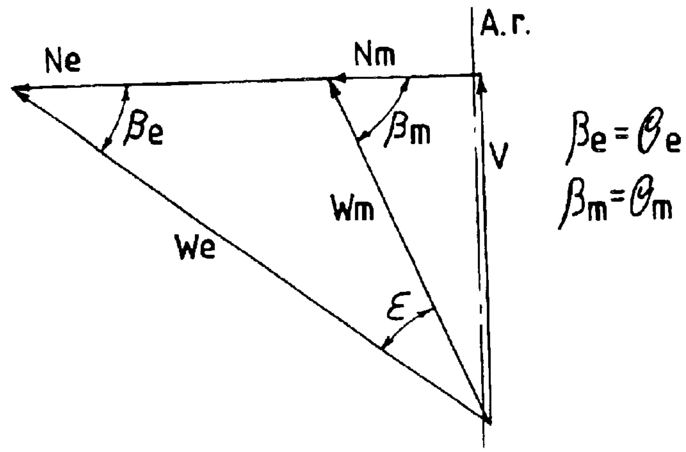
FIGS. 1, 2, 3, 4, 5, 6, 7*a*, 7*b*, 7*c*, 8*a*, and 8*b* are mathematical vectorial models.
Figure 7A:
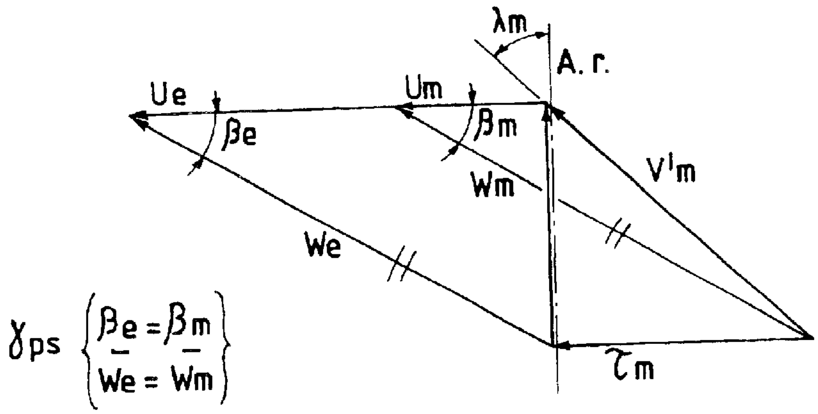
Figure 7B:
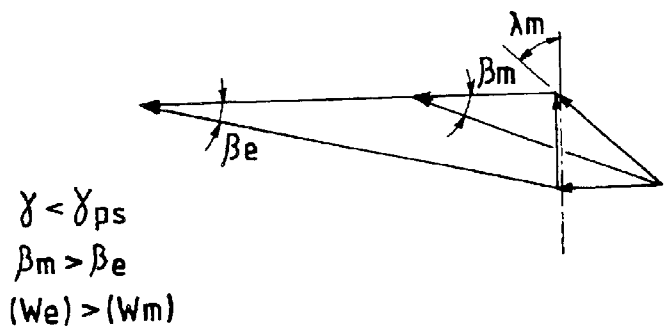
Figure 7C:
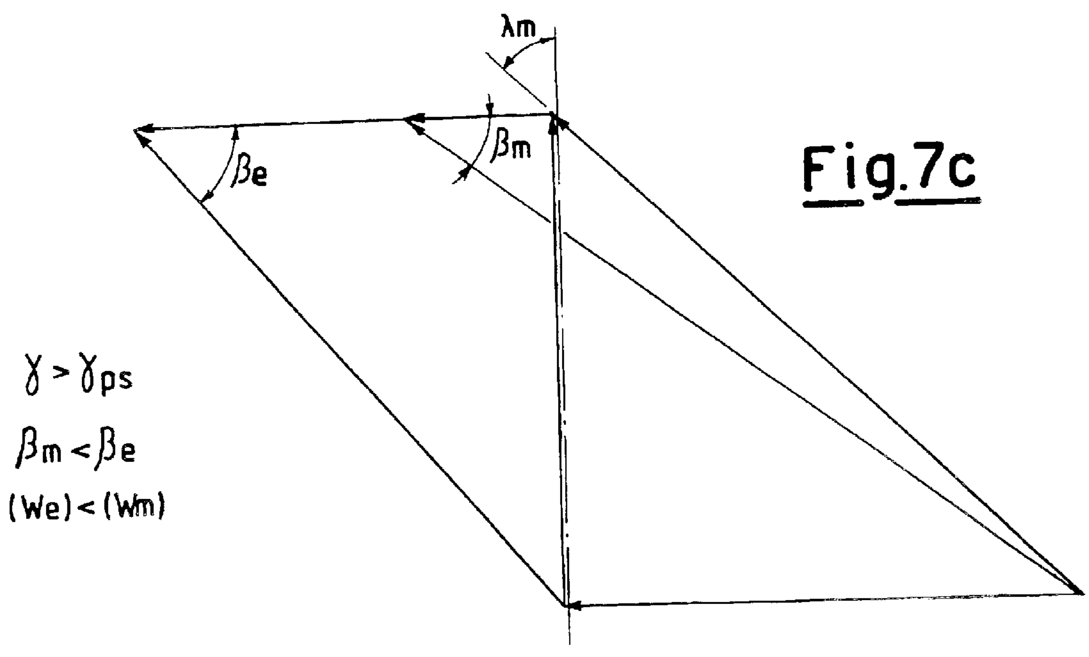

Analysing the field diagram of a traditional fan, shown in FIG. 1, it's clear that the angles β increase from the tip toward the hub. Thus the lower the value of β is at the tip, the higher the value will be at the hub of the rotor blades. That means the aerodynamic efficiency is higher to the tip than in whatever other sections. Thus the idea disclosed according to this invention in order to increase the propeller efficiency is: modify the direction of the streamline along the rotor blade so that any β angles are the same of the tip section, where the efficiency is the highest. Moreover, since the speed triangle has not been modified to the tip of the fan, supersonic speed W can easily be avoided and the overall turbine efficiency will not be reduced. Just have a look to the whole operating range of a fan. Supposing that FIG. 7*a* identifies the design phase of the stator twist (identified by $\gamma_{ps}$ that is the ratio between the speeds V and U), it can be notice that, with values of γ lower than $\gamma_{ps}$ (FIG. 7*b*) the angles β are higher toward the hub; on the contrary, with values of γ higher than $\gamma_{ps}$ (FIG. 7*c*) the angles β are lower toward the hub.

Figure 10C:
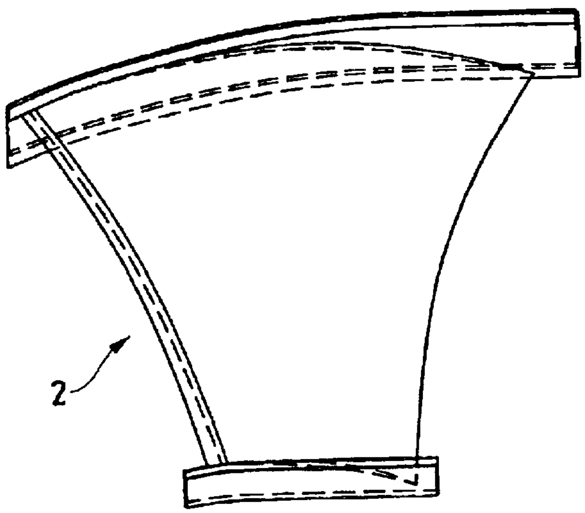
FIGS. 10*a*, 10*b*, 10*c*, and 10*d* show a constant deflection stator blade from the a), b), c) and d) views which are the plan, front, side and perspective views, respectively.
Figure 10B:
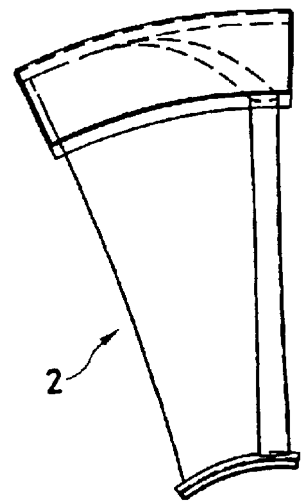
Figure 10D:
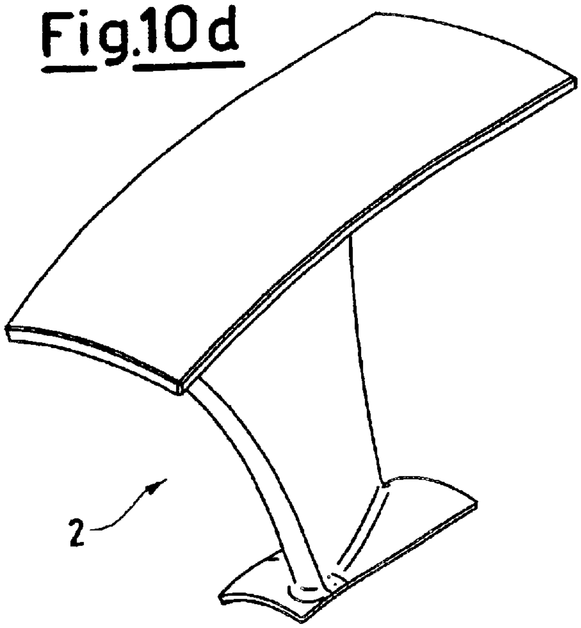
Figure 10A:
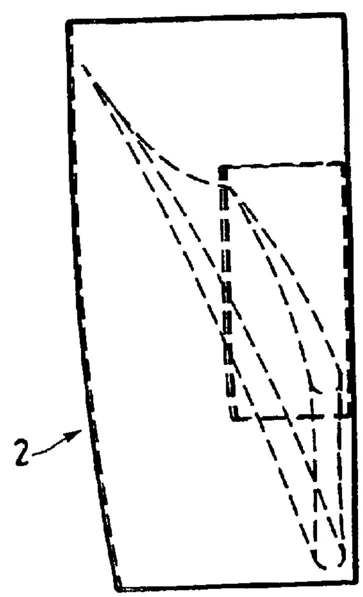
Figure 11B:
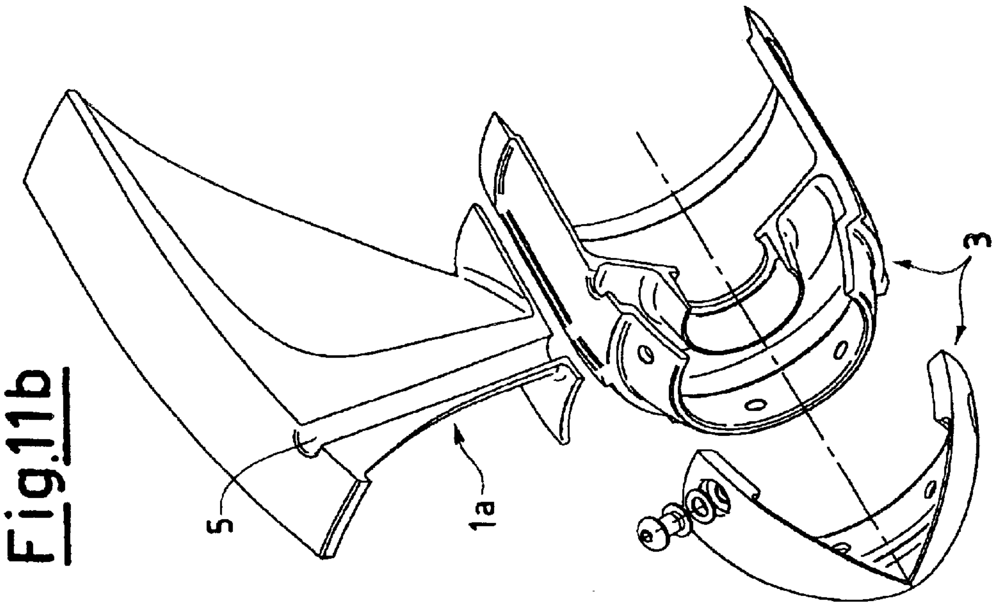
FIGS. 11*a* and 11*b* are assembled and exploded, perspective views of the propeller cuff with the twisted stator blade.
Figure 11A:
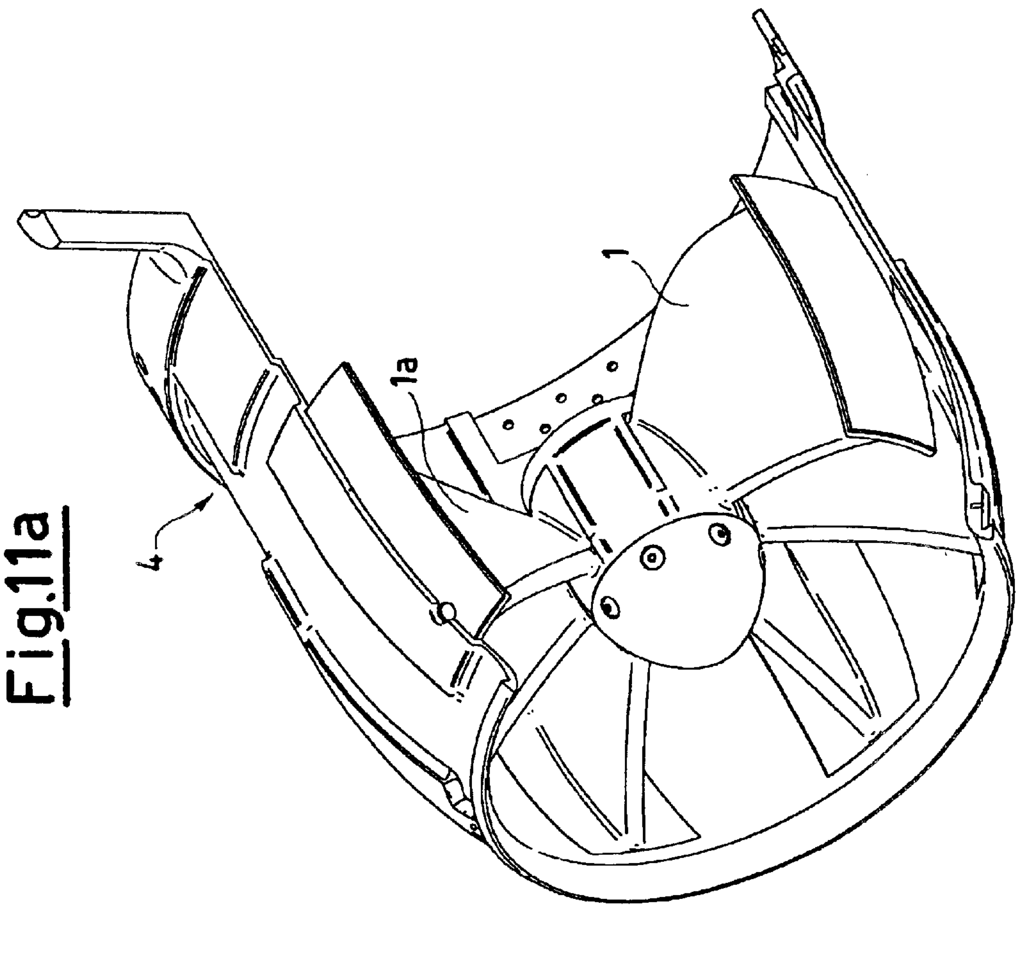

Conclude the description of the twisted stator row located in the Air-Intake, we call the attention to FIGS. 9, 10*e* 11 which show, respectively:

- the twisted stator blade 1 according to the invention in the plan a, front b, side c and perspective d views;

the constant deflection stator blade 2 in the plan a, front b, side c and perspective d views;

the assembly of the blades according to the invention in the Air Intake 4 and in the propeller cuff 3 which can be split in two pieces; the scope of the hole 5 in the blade 1*a* is to allow the passage for electric wires of the slip-rings.

The use of the variable pitch propeller in the engine according to the invention is motivated by the benefits already disclosed in the background.

Figure 12A:
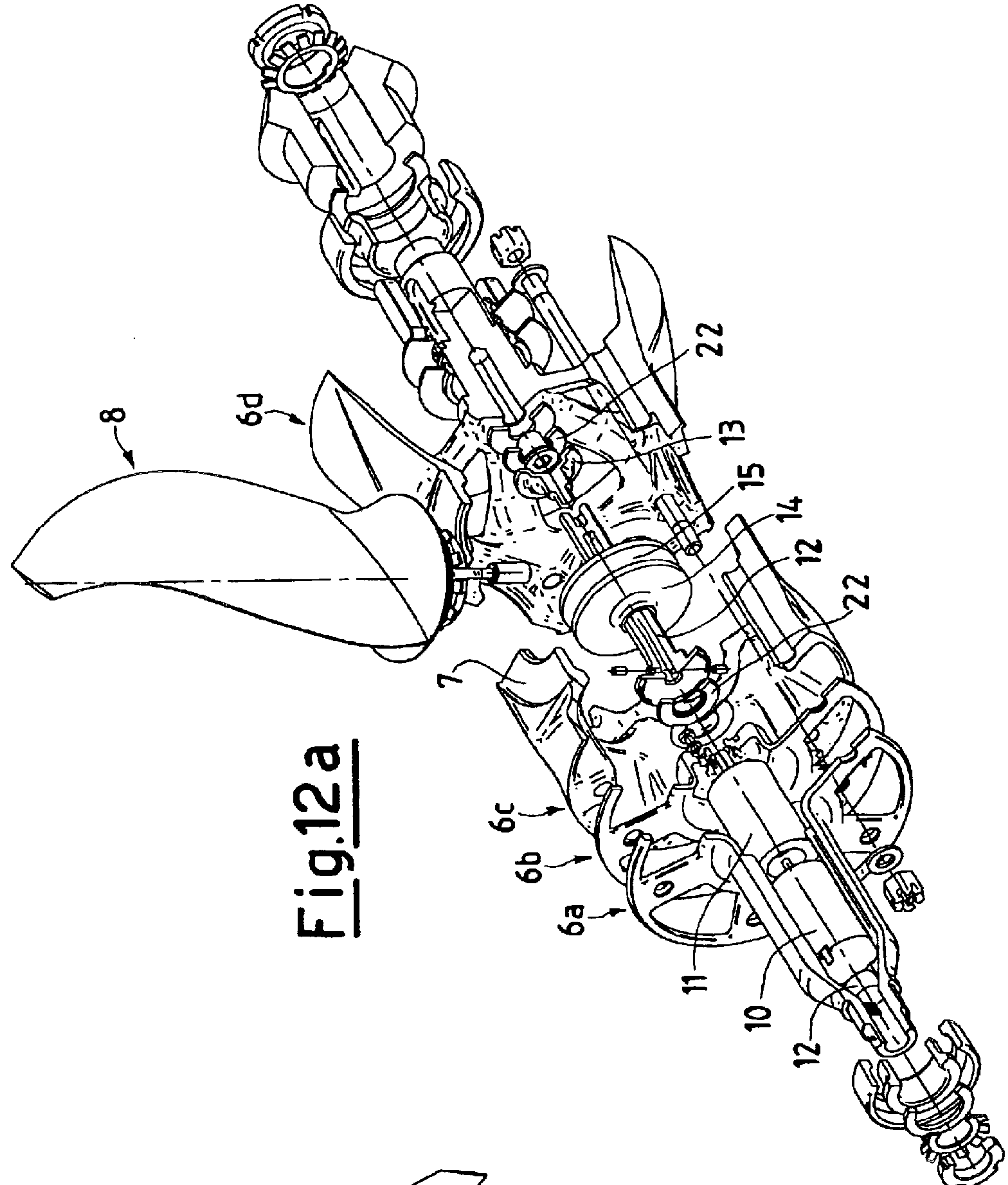
FIGS. 12*a*, 12*b* and 13*a* are the exploded, assembled and sectional views of a rotor with variable pitch blades according to the invention.
Figure 12B:
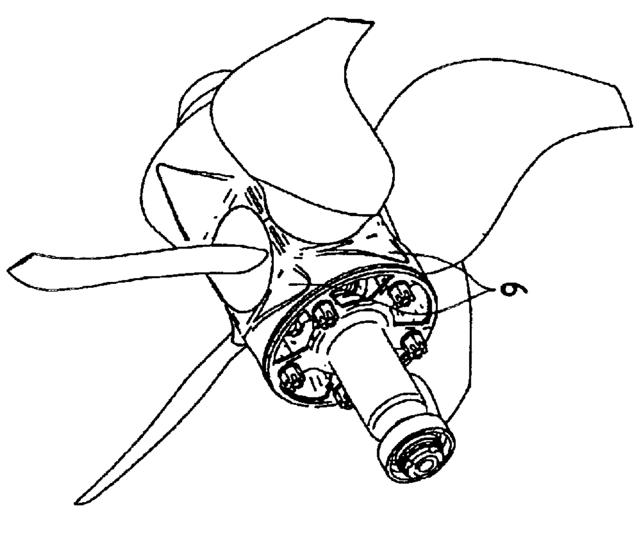

The proposed variable pitch system, which is activated by an electric motor, is of the screw/female thread type and is contained in the rotor represented by FIGS. 12*a,* 12*b*, and 13*a* in exploded, assembled and sectional views, respectively. The rotor is formed by four parts 6*a,* 6*b,* 6*c* and 6*d.* The rotor parts 6*c* and 6*d* have the radial sections, in which are lodged the flat roots of the rotor blades, with a polygonal shape that allow to obtain circular flat housings 7. Furthermore in the part 6*c,* helicoidal cavities 9 are obtained, in order to balance the geometry change from the circular to the polygonal shape, by directing the fluid toward the blades with the maximum efficiency.

The motor 10 is directly connected to a planetary gearbox 11 and to an encoder 12, and is powered by a slip-rings (not shown) positioned close to the front bearing. The reduction gear shaft 11 is fixed to a worm screw (formed by the parts 12 and 13) on which a threaded ring nut 14 moves axially when the screw turns. In the groove 15 obtained in the treated nut 14 are constrained the bushes 16, these last connected to the eccentric arms 18 of the plate 19 by means of elastic rings 17. When the nut 14 moves axially, the eccentric arms 18 and thus the plate 19 causes the blade 8 to rotate, transferring the rotation from the cavities 20 to the slots 21 (see FIG. 13*b*).

Figure 13A:
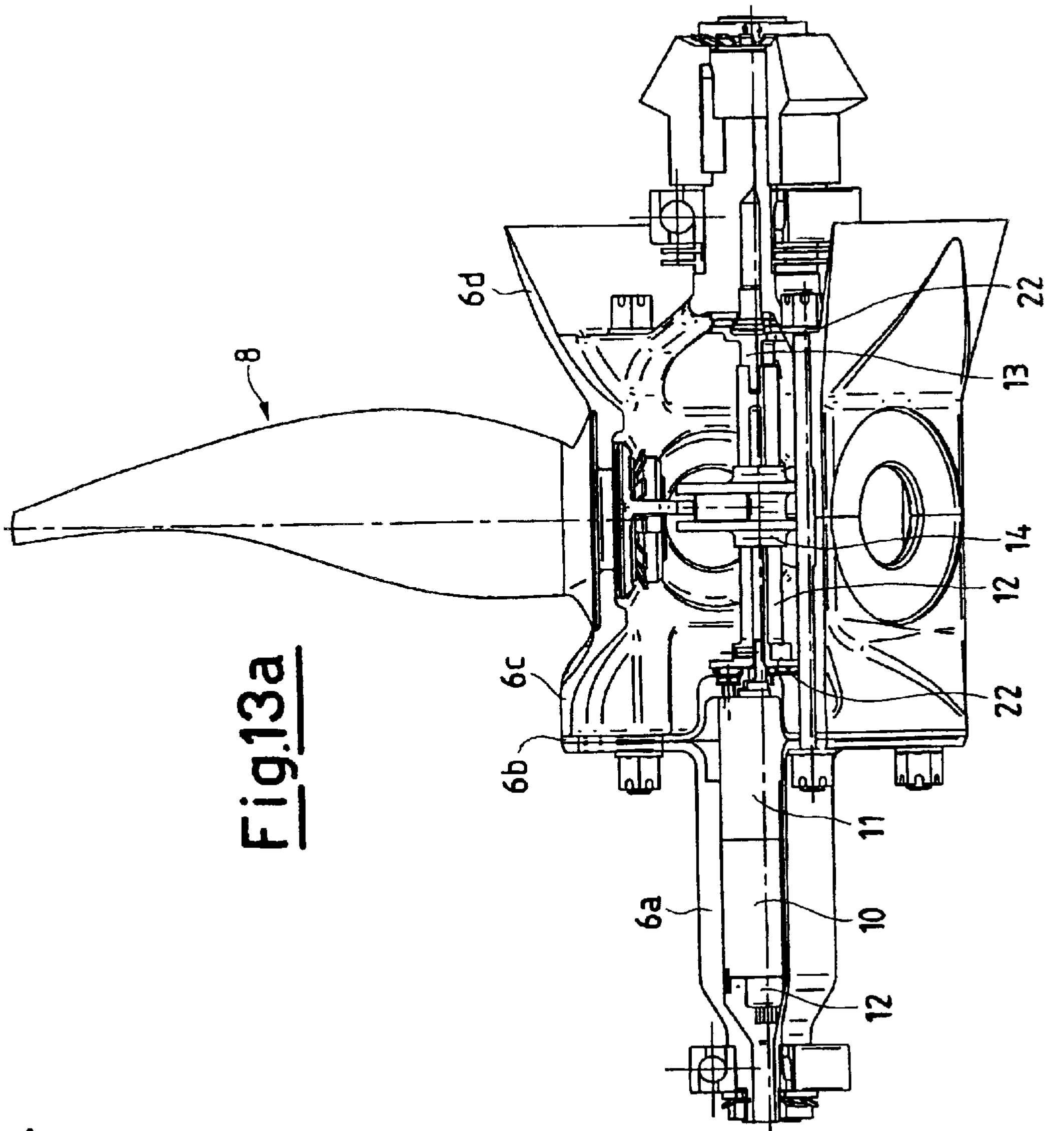
Figure 13B:
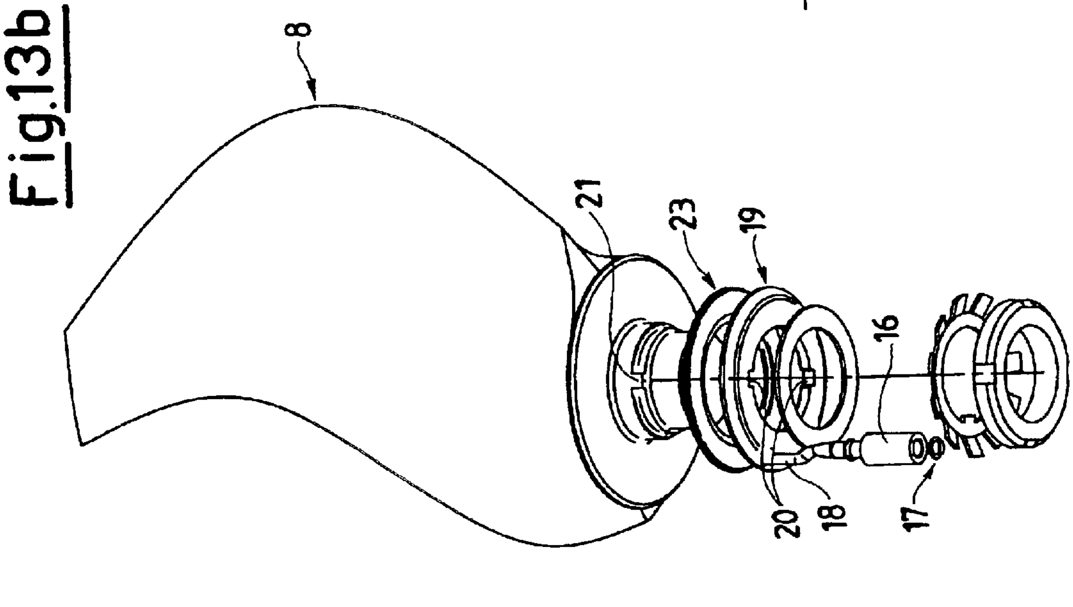
FIG. 13*b* is a view of the variable pitch blade according to the invention.

The axial loads transferred from the nut 14 to the screw (12 and 13) are unloaded on the rotor parts 6*b* and 6*c* through thrust bearings 22 (FIG. 12*a*). The centrifugal force due to the blades 8 and to the related components is instead unloaded on the rotor parts 6*c* and 6*d* through the thrust bearings 23 (FIG. 13*b*).

Figure 17B:
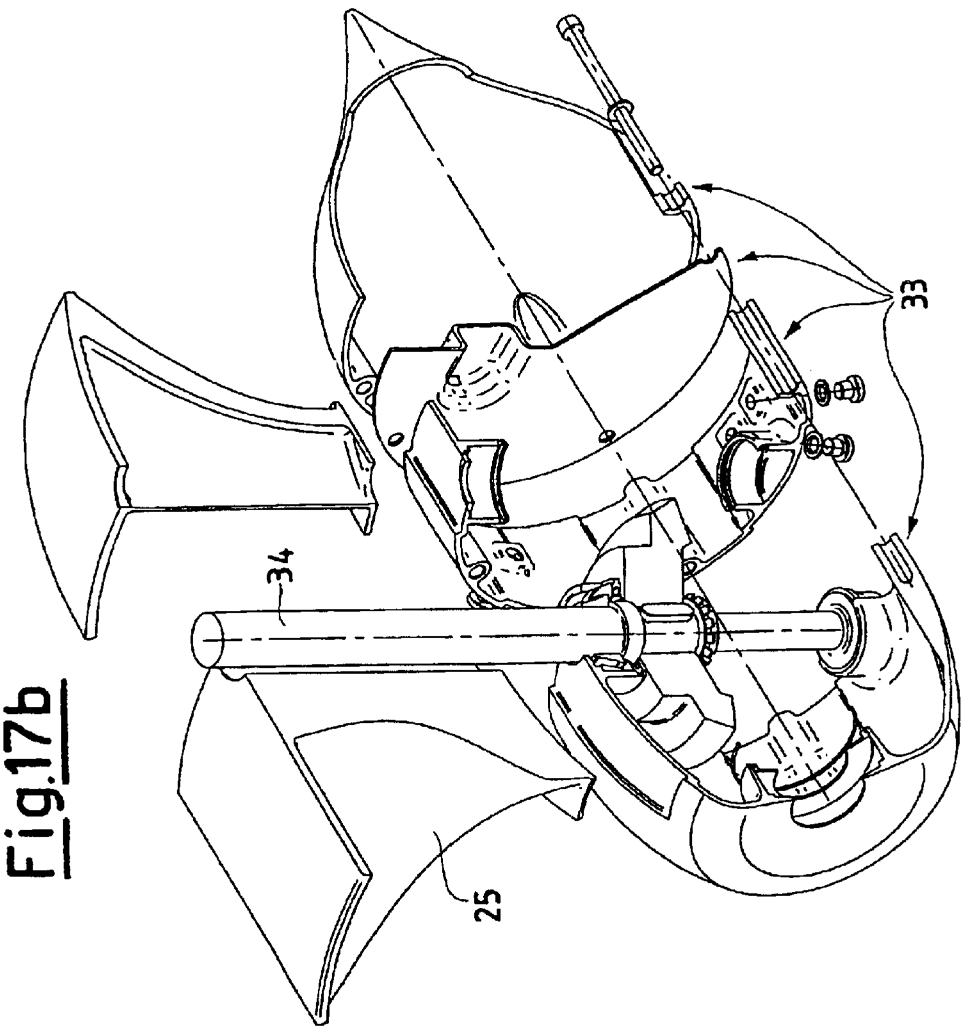
FIGS. 17*a* and 17*b* are assembled and exploded views, respectively, of the stator part downstream of the rotor.
Figure 17A:
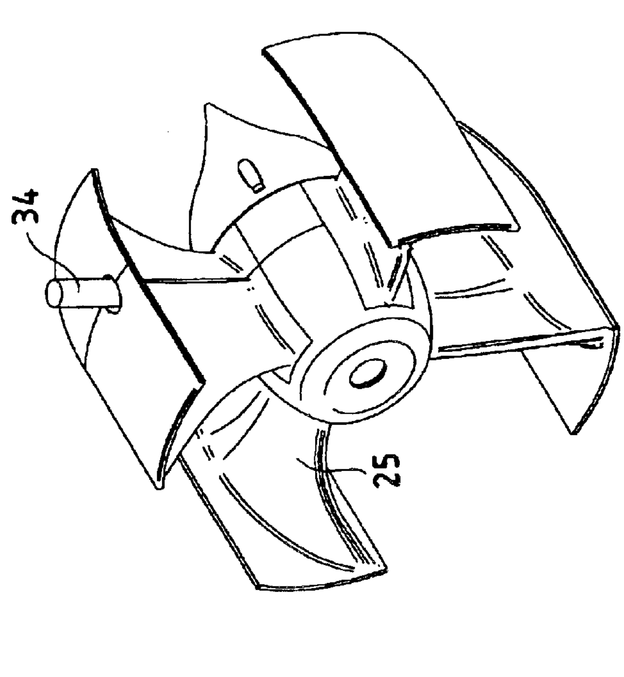
Figure 18:
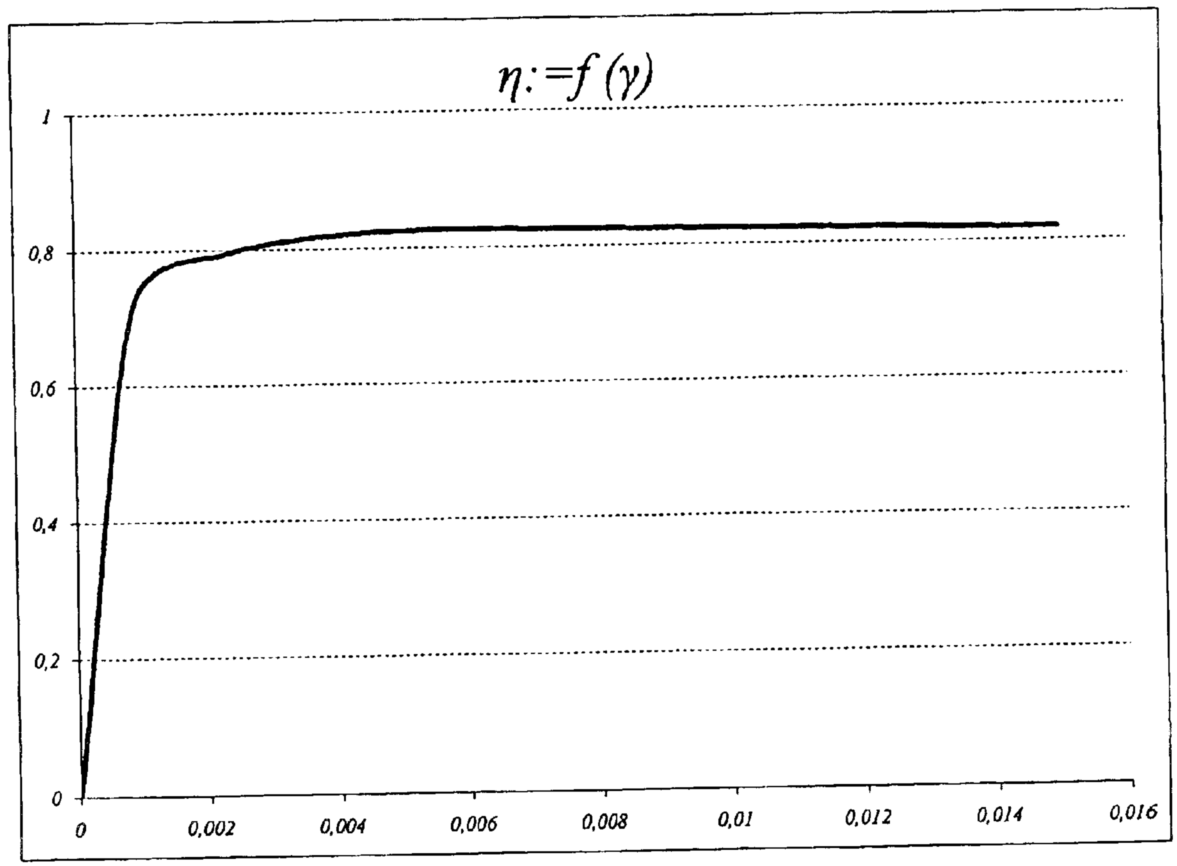
FIGS. 18, 19 20, and 21 are efficiency diagrams.
Figure 19:
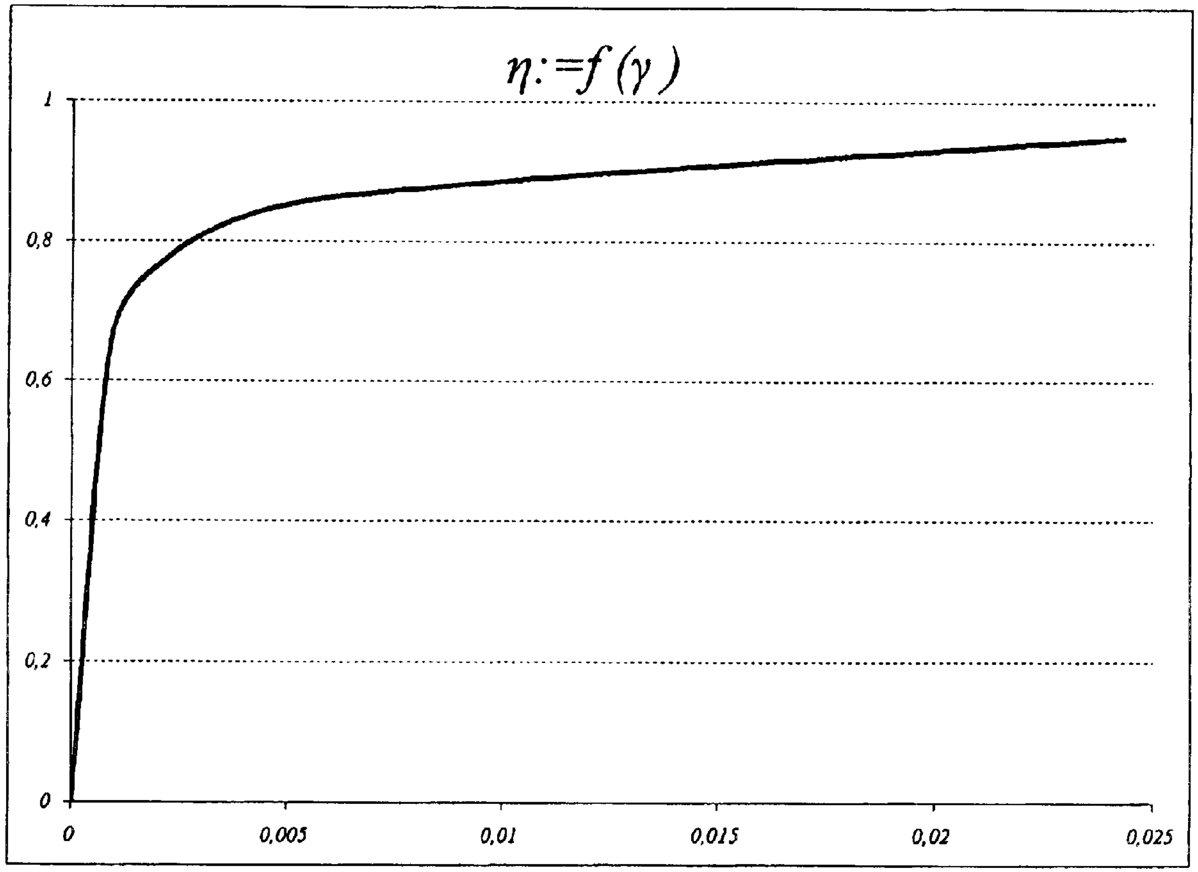
Figure 20:
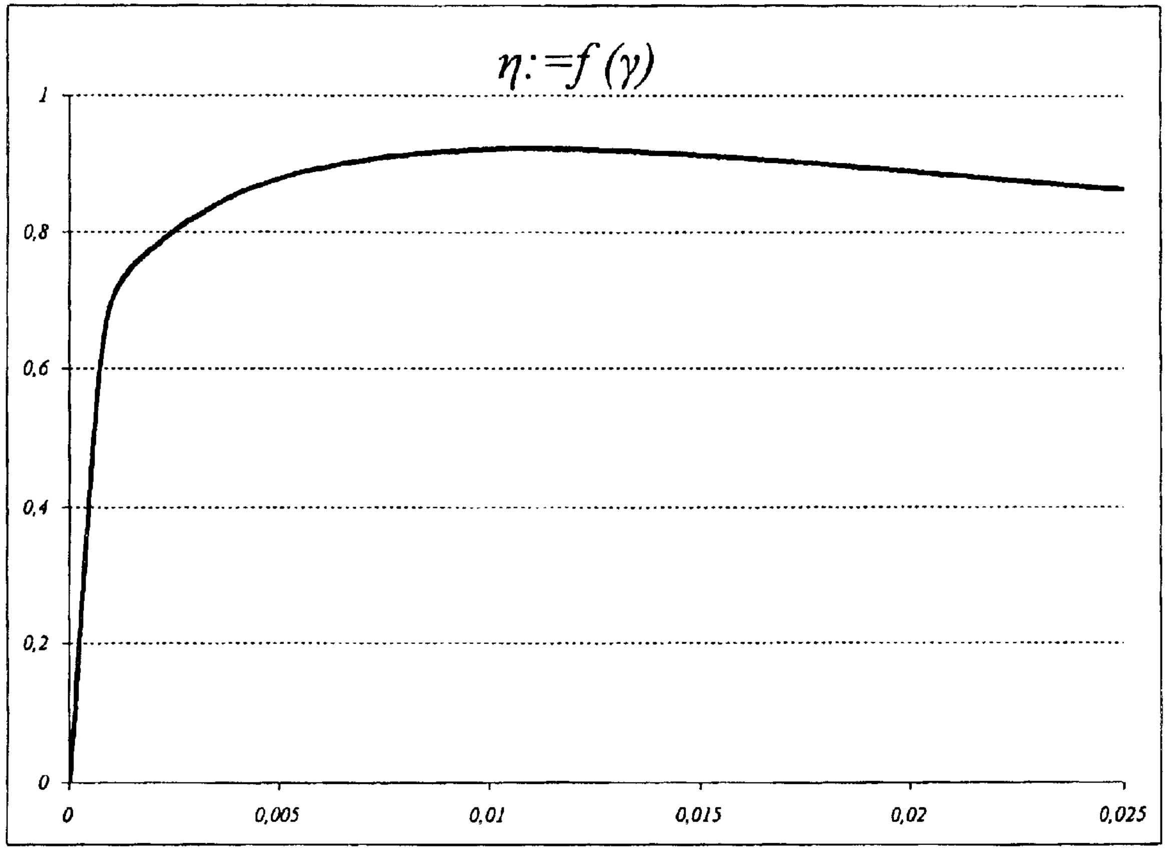
Figure 21:
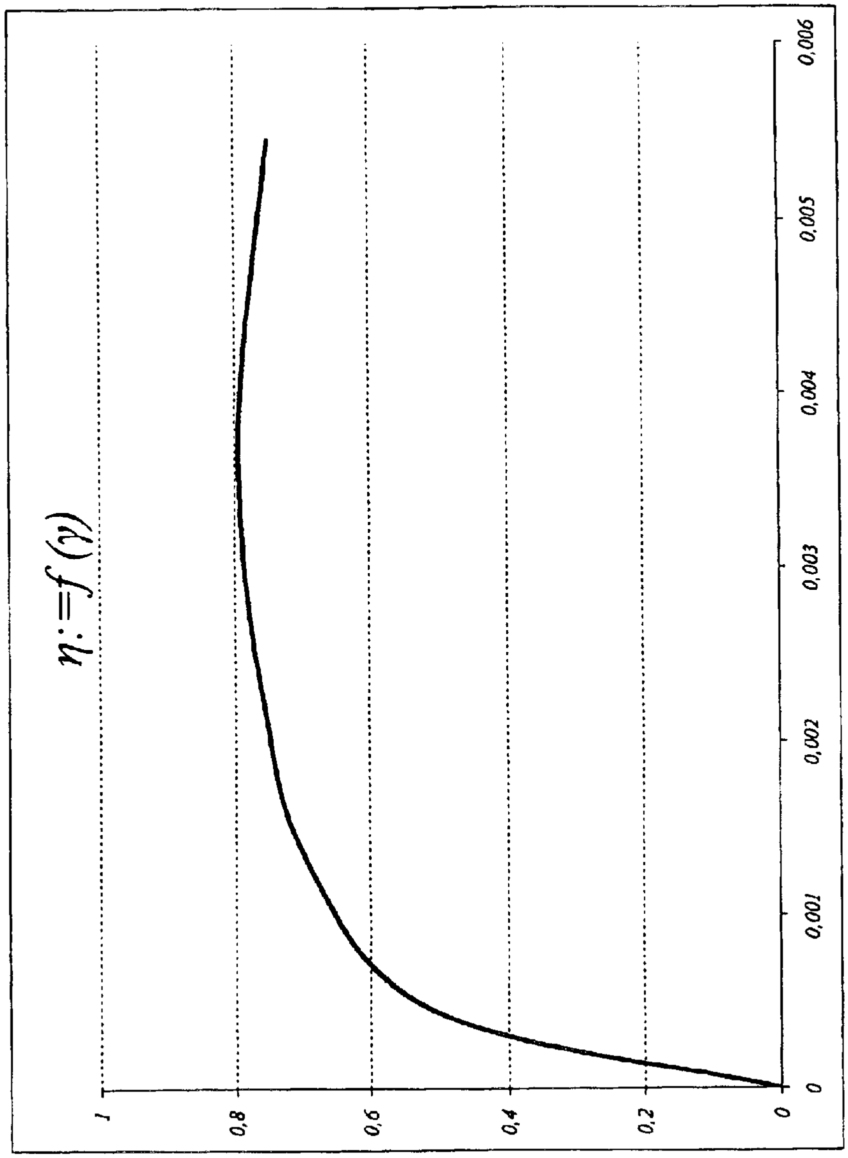

The rotor is set in rotation by a conic couple of gears, contained in the gear oil sump 33 downstream of the rotor, by means of a power shaft 34 contained inside the stator blades (see FIG. 17). The rotor is constrained to the gear oil sump 33 and to the propeller cuff 3 by means of ball or roller angular bearings mounted with an O disposition.

Figures 8A, 8B:
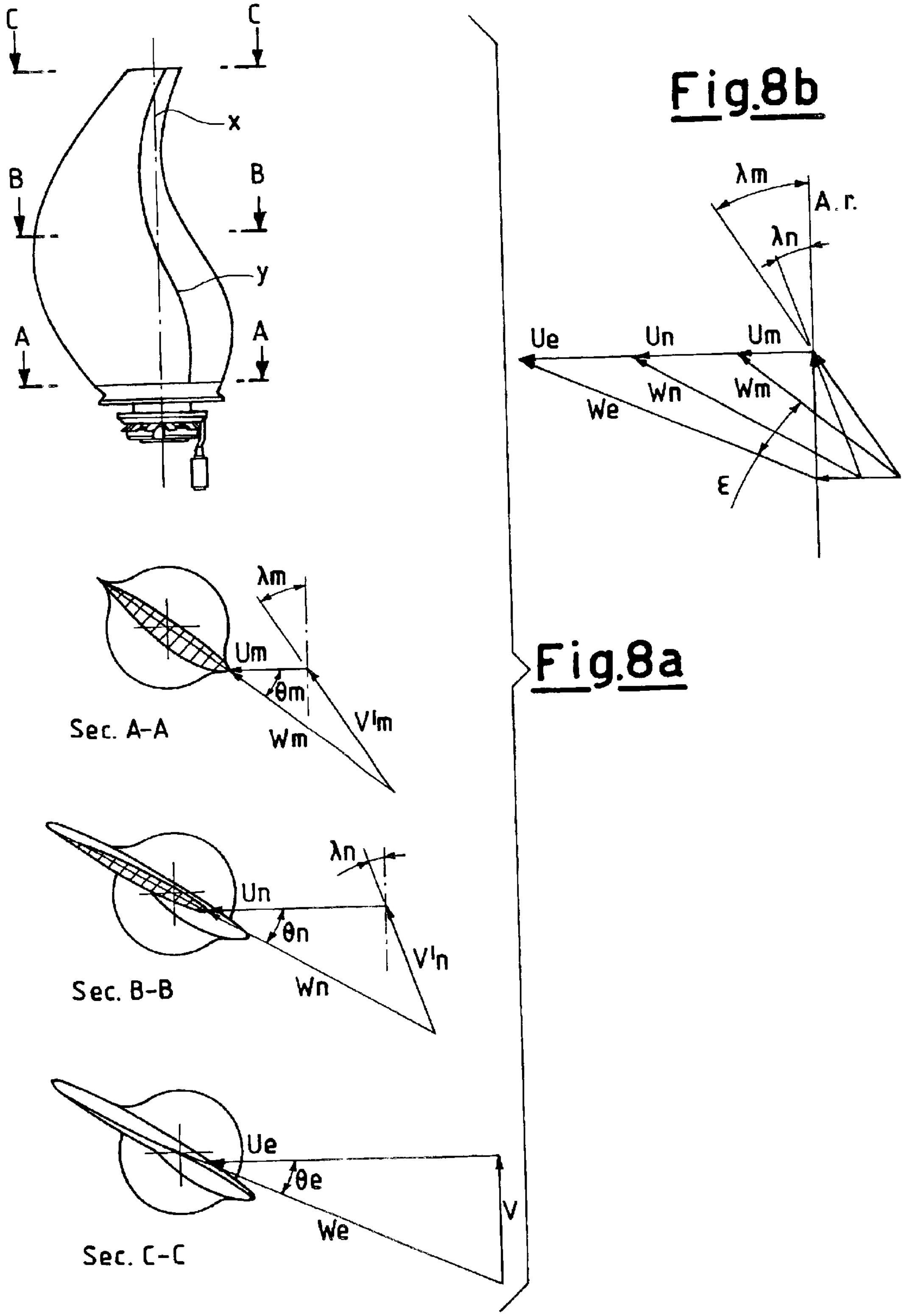
Figure 9C:
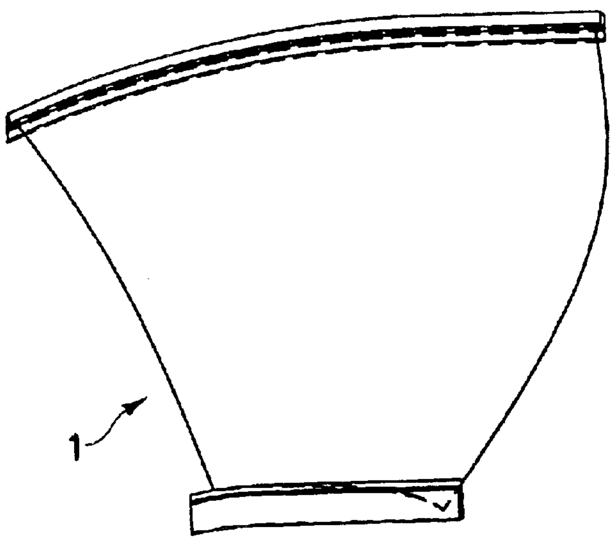
FIGS. 9*a*, 9*b*, 9*c*, and 9*d* show a twisted stator blade from the a), b), c) and d) views which are the plan, front, side and perspective views, respectively.
Figure 9B:
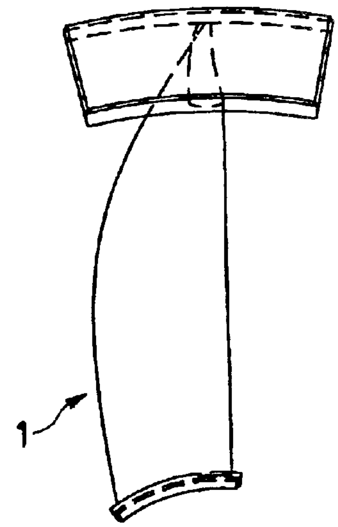
Figure 9D:
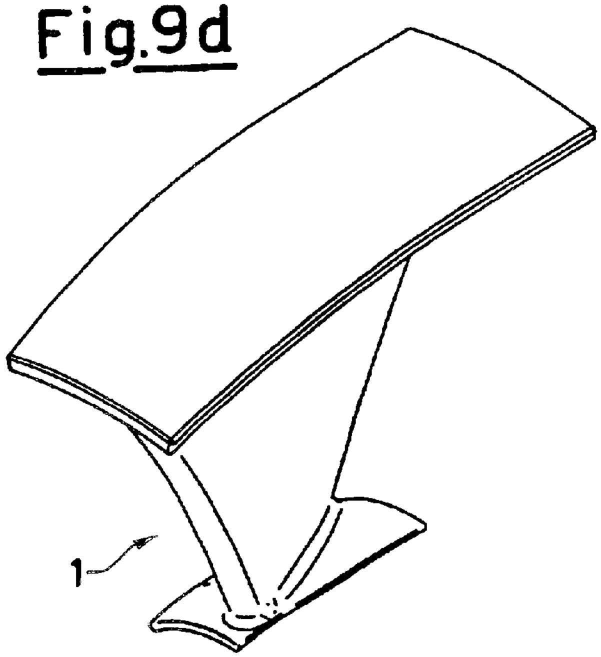
Figure 9A:
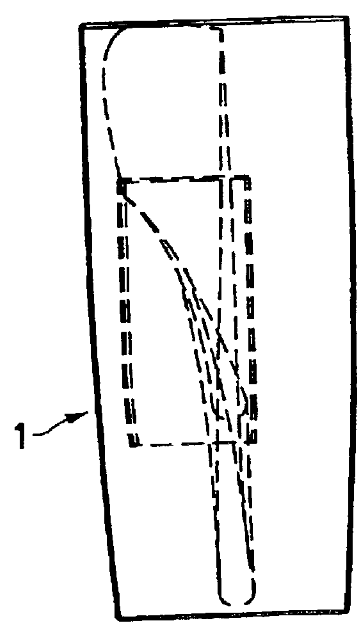

The sinusoidal shape, of the rotor blade 8 according to the invention, is obtained by locating some of the pressure centres of the airfoils Cp (points on which the resultants of the aerodynamic forces are applied) upstream and others downstream of the variable pitch rotation axis x, so that the torques, which are generated because of the aerodynamic forces, balance each other, thus allowing the use of a low power input to activate the variable pitch. Moreover, such a radial disposition of the airfoils, allows moving the centre of mass of the rotor blades coincident to the pitch rotation axis x or even located downstream it. This aspect is important because it counters the inherent turning moments of variable pitch fan blades, due to the high centrifugal forces, but without adopting any counterbalance weight. FIG. 8 shows the rotor blade according to the invention: the airfoils on the hub and at the tip are positioned so that the axis x coincides with the centre line of the chord; while the other airfoils are positioned so that, under all circumstances, the resulting torque changes within a minimum value range; therefore the line that joins the Cp of all the blade airfoils, has a sinusoidal path y. In order to avoid the Von Karman vortices, which would reduce the efficiency, the root of the blade 8 is flat, circular and it is housed in the flat/circular cavities 7 obtained in the rotor parts 6*c* and 6*d.*

The "diffuser" stators downstream of the rotor are useful to eliminate the swirl of the air-flow processed by the rotor in order to increase the pressure and therefore the thrust; and the movable twisted part is mainly necessary to decrease the pressure losses. Indeed, especially in the high speed fan, the speed triangles both upstream and downstream the rotor change during the fan operating range thus changing both the amplitude and the orientation of the absolute air-speed downstream the rotor. This means that, by controlling the position of the twisted movable parts, it is possible to always have low attach angle and thus reduce the energy losses and avoid stall flutter.

Figure 14B:
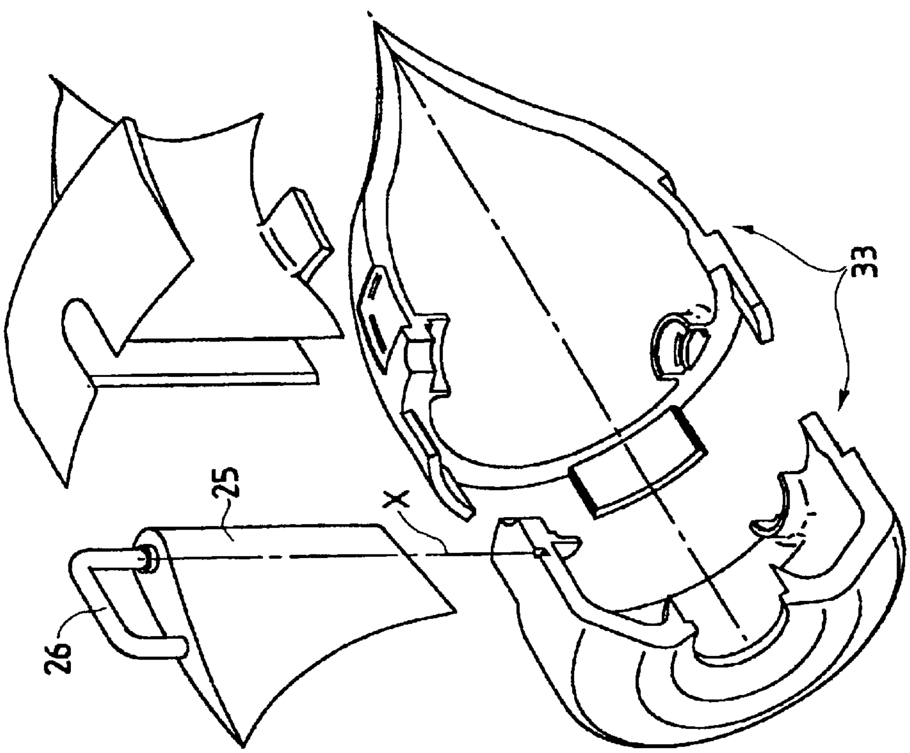
FIGS. 14*a* and 14*b* are partially assembled and exploded views, respectively, of the stator part downstream of the rotor.
Figure 14A:
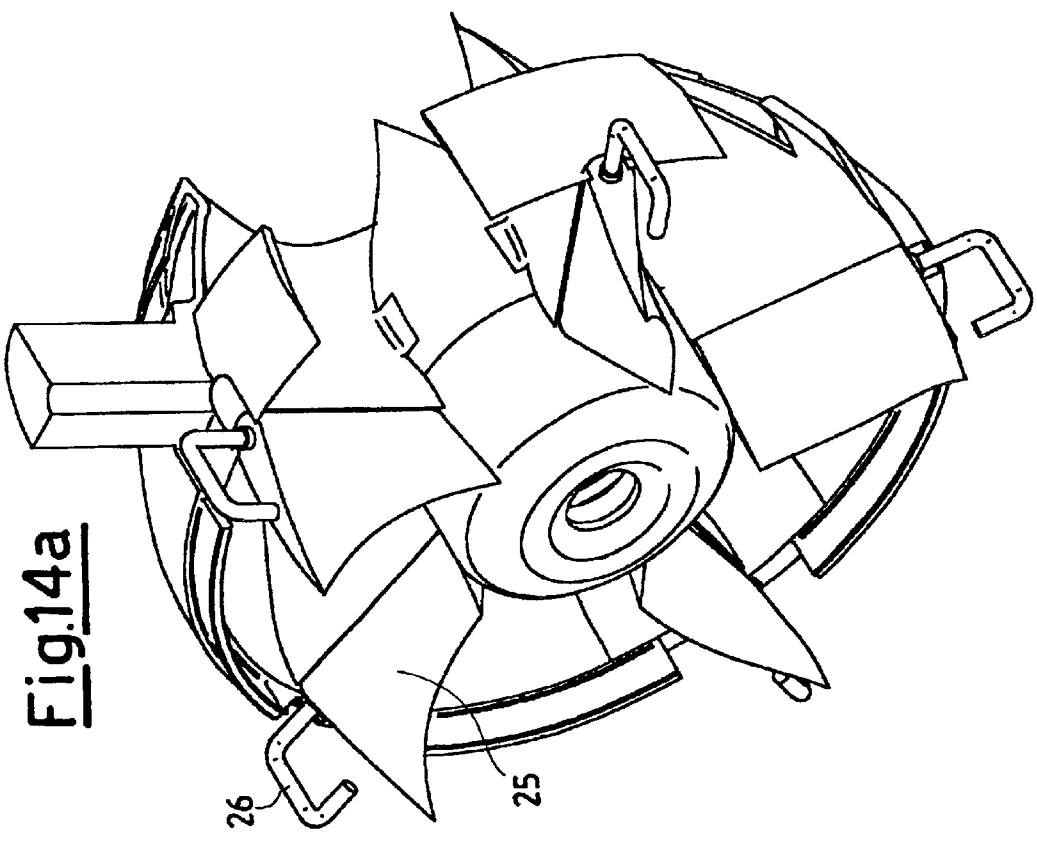
Figure 15B:
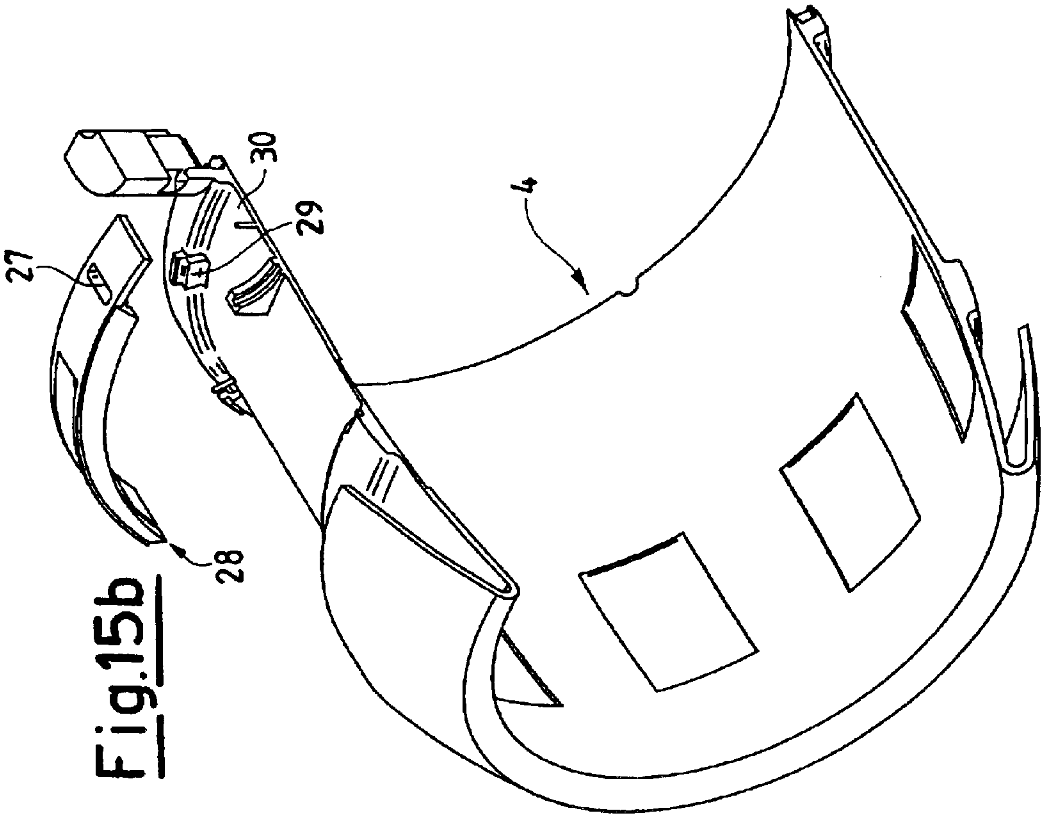
FIGS. 15*a* and 15*b* are partially assembled and exploded views, respectively, of the engine casing downstream of the rotor.
Figure 15A:
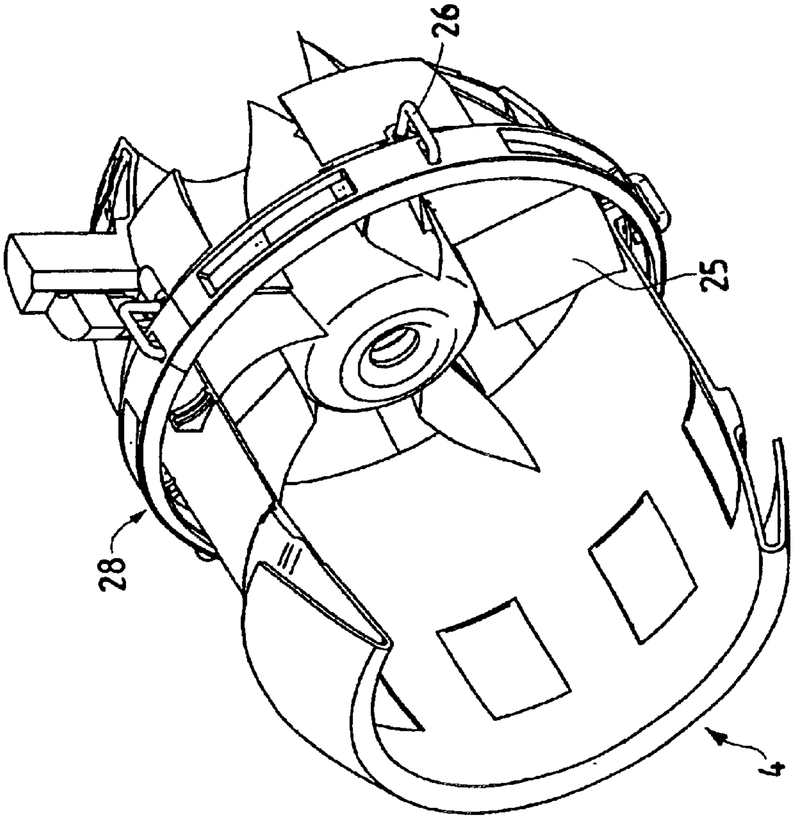
Figure 16:
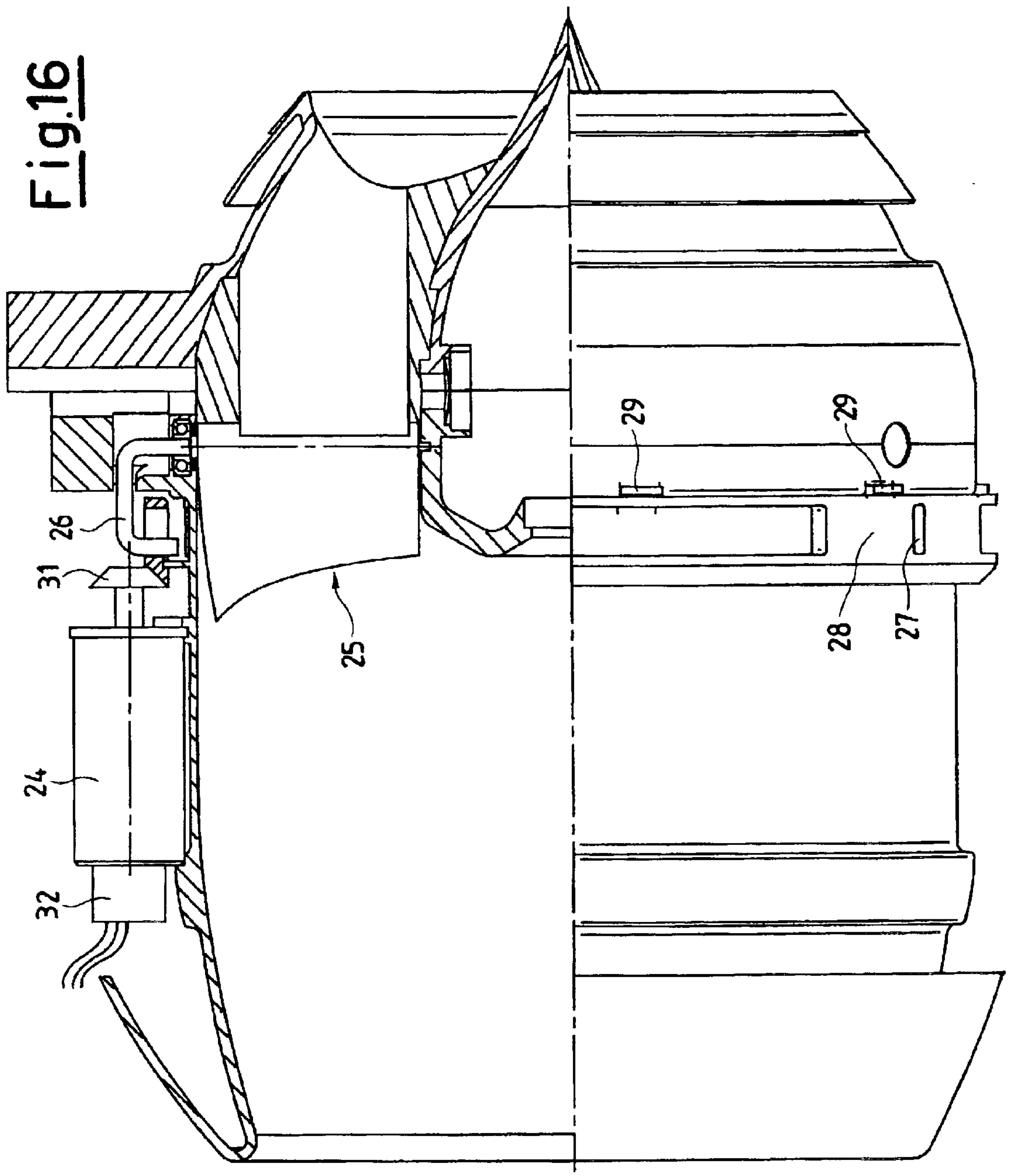
FIG. 16 is the axial sectional view of the stator part and of the engine casing downstream of the rotor.

The exploded and assembled views, of the proposed electro-mechanics actuation system according to the invention, are represented in FIGS. 14*e* 15; the side sectional view is instead shown in FIG. 16. The movable parts 25, driven by at least one electric motor 24, have projecting folded levers 26 constrained in eyelets obtained in the ring gear 28. This last is linked to the outer structure. The ring 28 rotates by means of the coupling with conic gears (28 and 31) and, by dragging the levers 26, causes the blades 25 to rotate. Likewise the electro-mechanic actuation system proposed for the variable pitch rotor blades, also in the stator actuation system could be used a further gearbox connected to the motor 24 both to reduce the number of turns and to increase the torque of the actuation shaft.

The actuation and the control of the movable parts are electric, because this type of technology is light, easy to control and allows use of a redundant system. At lest one electronic central unit processes the advancement speed, the number of turns of the propeller and the position of the blades, and it drives the electric motors, which activate both the rotor pitch mechanisms and the stator ones.

The positions of the blades 8 and 25 are respectively activated through the feedback by the encoders 12 and 32, which send to the central processing unit a comparison electric signal which is proportional to the instantaneous position.

The control of the fan pitch is different from the one of the movable part 25 because there is the possibility to position, through a control in the cockpit, the blade 8 at an offset angle with respect to the position determined by the central unit. This control allows the pilot to directly manage the performance of the propulsion system.

The description of the innovations introduced in the variable pitch fan according to the invention is concluded by comparing the propulsion efficiencies of four high speed fan designed with the same operating range. FIGS. 18, 19, 20 and 21 refer to a fixed pitch fan, to a variable pitch fan, to a variable pitch fan with constant deflection stator blades and to a variable pitch fan according to the invention with twisted stator blades. The diagrams clearly show the efficiency improvement achievable from the variable pitch fan according to the invention with respect to the current art of the fan.

Figure 22:
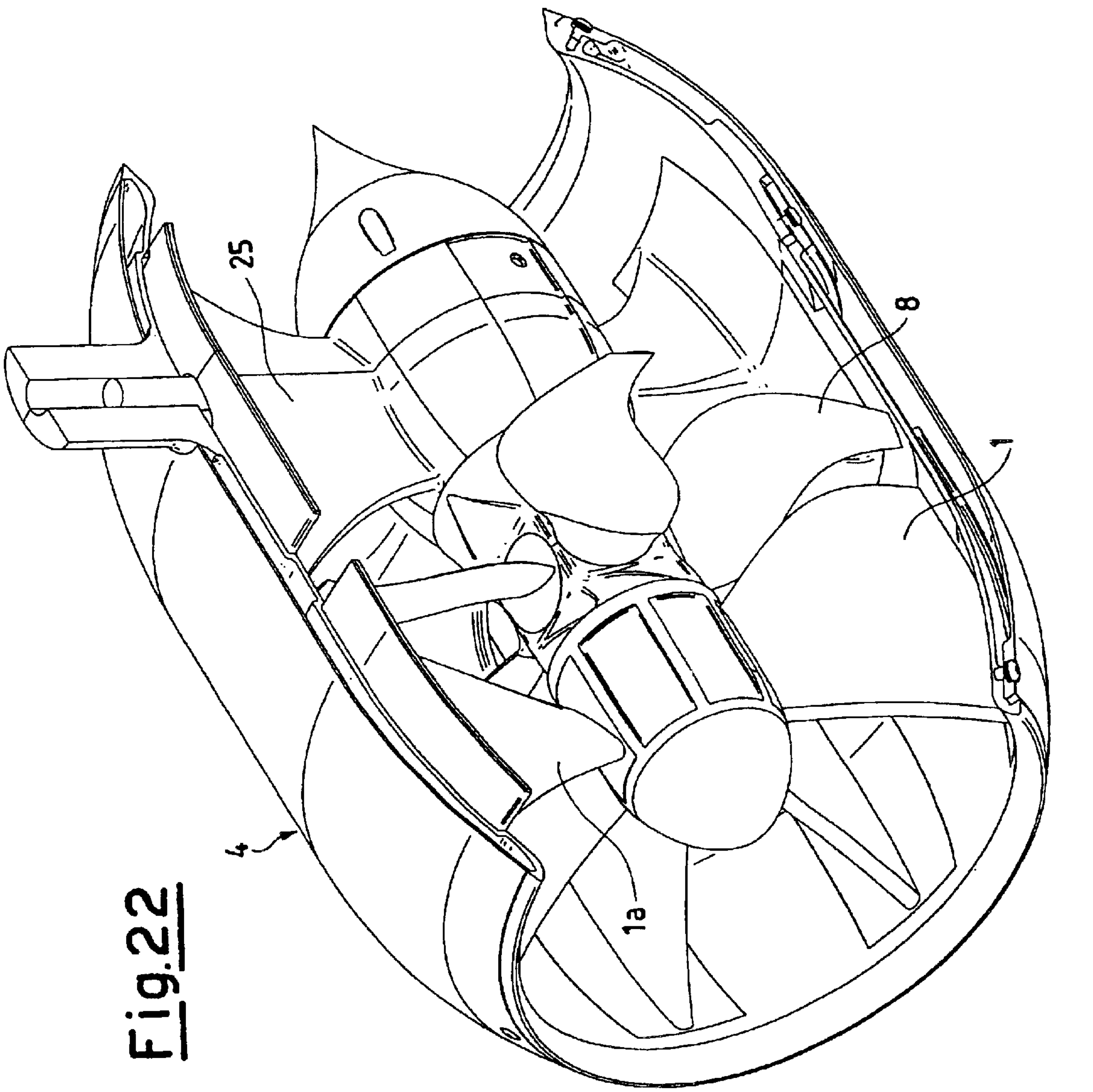
FIGS. 22 and 23 are axial sectional views of the full engine according to the invention.
Figure 23:
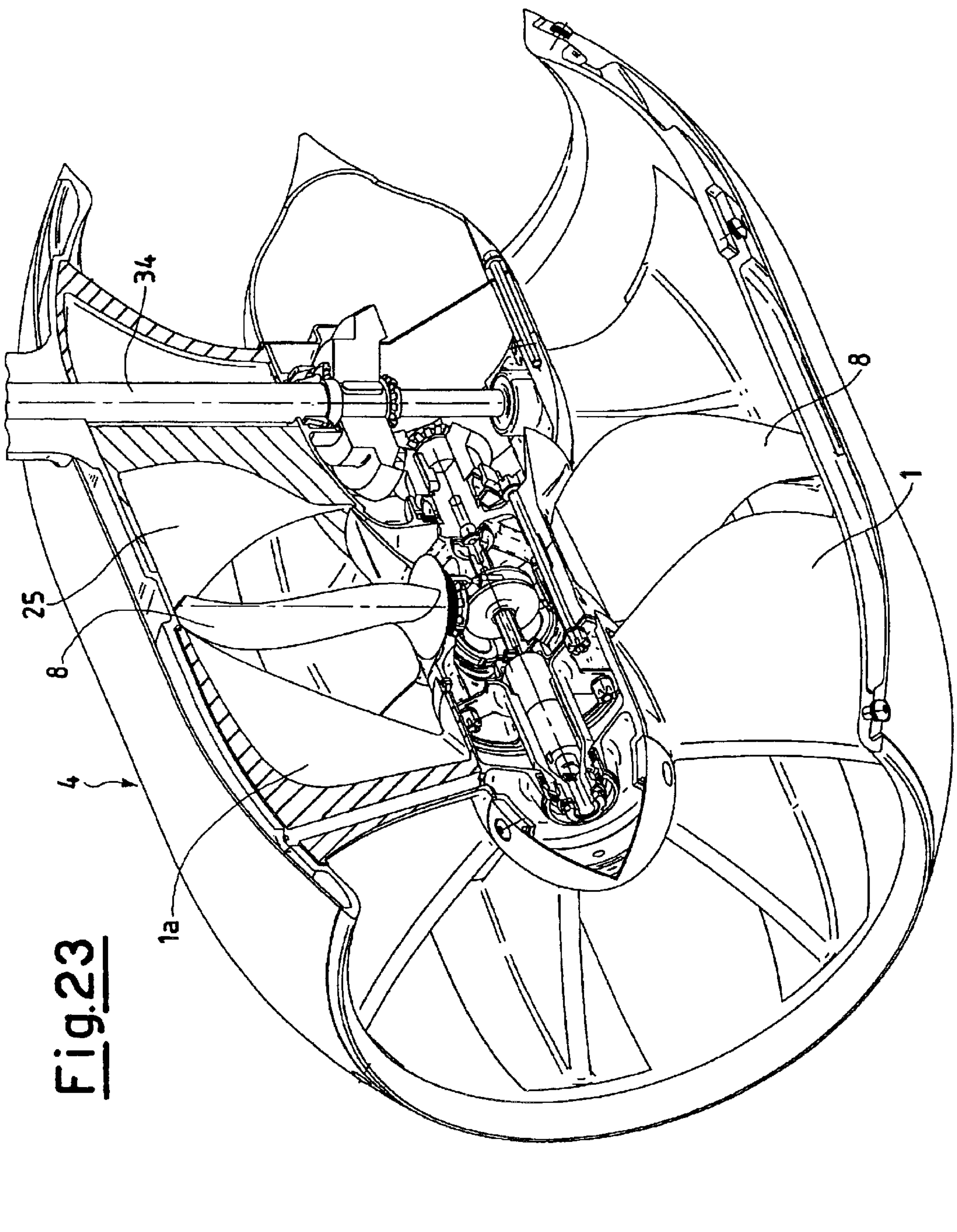

Finally, FIGS. 22 and 23 sketch the variable pitch fan according to the invention with all the described features.

What is claimed is:

1. A variable pitch fan, particularly for propulsion, of a type comprising a rotor and at least two stages of stator blades positioned upstream and downstream of said rotor, wherein the rotor blades are of a variable pitch type and have a sinusoidal shape, obtained by locating some pressure centers of the blade airfoils upstream and other pressure centers downstream of a variable pitch rotation axis, so that torques, which are generated by the aerodynamic forces, balance each other, thus allowing use of a low power input to activate the variable pitch; the airfoils on the rotor blade hub and end are disposed so that the axis coincides with a center line of the rotor blade chord, while the other airfoils are disposed so that, under all circumstances, resulting torque changes within a minimum value range, so that a line that joins the centers of all the blade airfoils, has a sinusoidal path.

2. A variable pitch fan according to claim 1, wherein the stator blades, positioned before the rotor, are of a twisted type.

3. A variable pitch fan according to claim 2, wherein the stator airfoils must deviate an advancement speed V so as to generate relative speed vector W always equal, in module and in direction, in all sections to the vector W, closed at the blade end; thus in associated velocity triangles, of all the rotor blades sections, angles are equal in value to angles at the blade end, where it has been demonstrated that there is highest efficiency.

4. A variable pitch fan according to claim 1, wherein the stator blades, positioned before the rotor, are of a constant deflection type.

5. A pitch fan according to claim 1, wherein the stator blades, positioned after the rotor, are of a twisted type.

6. A variable pitch fan according to claim 5, wherein the stator blades positioned downstream of the rotor are formed by a fixed part and by a movable part.

7. A variable pitch fan according to claim 5, wherein a movable part of the stator blades positioned downstream of the rotor are driven by an electric motor; the blades have, at their free ends, projecting folded levers are housed in eyelets obtained in a ring gear; said ring is linked to the fan outer structure by means of the fan shoulders and of pins obtained on the outer structure; by activating the motor, by means of coupling with conic gears, also the ring rotates and, by dragging the levers, causes the blades to rotate.

8. A variable pitch fan according to claim 1, wherein the variable pitch of the rotor blades is activated by an electric motor which controls a screw female thread system contained in the rotor; said rotor is formed by four parts which contain the blades having a polygonal shape, in circular housings obtained in transverse sections; in one of the four parts, helicoidal cavities are obtained which balance the geometry change, from the circular to the polygonal shape, by directing the fluid toward the blades.

9. A variable pitch fan according to claim 8, wherein the motor is directly connected to a planetary gearbox and to an encoder and is powered by a slip-rings; a reduction gear shaft is linked to a worm screw on which a threaded ring nut moves by rotation; bushes, connected to eccentric arms of a plate by means of elastic rings, are retained in a groove obtained in the ring nut.

10. The variable pitch fan according to claim 9, characterized in that axial loads acting on the screw are unloaded on the rotor by way of trust bearings, and not on the reduction gear shaft.

11. A variable pitch fan according to claim 1, wherein the rotor is set in rotation by a conic couple of gears, contained in a gear oil sump, by means of a power shaft contained inside the stator blades which are positioned downstream of the rotor; said rotor is linked to the gear oil sump and to a propeller cuff by means of ball or roller angular bearings mounted with a "O" disposition.

12. A variable pitch fan according to claim 1, wherein
actuation and control of the blades are of an electric type;
an electronic central unit processes input data consisting of
advancement speed and
number of revolutions of the fan propeller and,
drives two electric motors which move the rotor pitch mechanisms and the pitch mechanisms of the movable stator parts;
the blade positions are respectively activated through the feedback of encoders which send a central processing unit a comparison electric signal which is proportional to the blade instantaneous position.

13. A variable pitch fan according to claim 12, wherein control of the propeller pitch is different from the control of the pitch of the stator movable part in order to position the blade at an offset angle with respect to the position controlled by the central unit.

14. The variable pitch fan according to claim 13, characterized in that the central unit has the following flight options: max efficiency, max thrust, and reverse.

* * * * *